United States Patent [19]

Sheridan

[11] 4,187,192
[45] Feb. 5, 1980

[54] TALC DISPERSIONS

[75] Inventor: Geoffrey P. Sheridan, Manchester, Urmston, England

[73] Assignee: Lankro Chemicals Ltd., Manchester, England

[21] Appl. No.: 876,172

[22] Filed: Feb. 8, 1978

[30] Foreign Application Priority Data

Feb. 14, 1977 [GB] United Kingdom ............... 6084/77

[51] Int. Cl.$^2$ ............................................. B01J 13/00
[52] U.S. Cl. ............................ 252/313 R; 106/287.1; 106/308 S; 162/181 C; 252/314
[58] Field of Search ......................... 252/313 R, 314; 106/287.1, 308 S; 162/181 C

[56] References Cited

U.S. PATENT DOCUMENTS

| | | | |
|---|---|---|---|
| 2,844,486 | 7/1958 | Lamar | 106/306 X |
| 3,067,053 | 12/1962 | Tarantino | 106/308 S |
| 3,954,556 | 5/1976 | Jackson et al. | 162/181 C X |

*Primary Examiner*—Richard D. Lovering
*Attorney, Agent, or Firm*—Alexis Barron

[57] ABSTRACT

The invention relates to stable high solids aqueous dispersions of talc (a natural but relatively hydrophobic complex hydrated magnesium silicate) useful in the preparation of coated paper in place of the currently-used china clay dispersions. The inventive compositions contain at least 60 wt % talc held as a stable dispersion by small quantities of one or more of certain sulphated ethoxylated phenol, or alkylated phenol, salts, optionally together with small amounts of antifoaming air-release agents (such as certain of the known polypropylene glycol-based ethylene oxide/propylene oxide co-polymers).

20 Claims, No Drawings

TALC DISPERSIONS

BACKGROUND OF THE INVENTION

(1) Field of the Invention

This invention relates to talc dispersions, and concerns more particularly stable aqueous dispersions of talc, having a high solids content, suitable for use in the coating of paper in place of the currently-employed china clay dispersions.

(2) Description of Prior Art

It is well-known in a number of fields to prepare and use high solids aqueous dispersions of clays and clay-like materials. Typically, for example, china clay (Kaolin) has been prepared as a high solids aqueous dispersion for addition to various water-dispersed natural or synthetic resins (latices) subsequently used to coat paper so as to give a surface having the desired properties. White clays such as china clay are, however, rather expensive, and efforts have been made to use talc (a complex hydrated magnesium silicate), a material which should in theory lead to results as good if not better than those achieved using china clay. Unfortunately, talc, unlike china clay, is relatively hydrophobic, and attempts to prepare aqueous talc dispersions, particularly stable high solids aqueous talc dispersions (which are desirable to reduce transport costs and cut drying time), have not been entirely successful. These past attempts to prepare talc dispersions have generally involved selecting particular grades of talc and/or selecting particular dispersing agents (or mixtures thereof) which can be used either to pretreat the talc or simply as part of the dispersion. However, it has not up to now been possible to prepare an aqueous talc dispersion which contains much better than 60 wt % talc and yet which is stable (so that the talc remains properly dispersed), has a viscosity enabling it to be pumped relatively easily, and employs dispersing agents all of which are compatible with the resins with which the talc dispersion is to be used.

SUMMARY OF THE INVENTION

We have now found that the use, as dispersing agent, of a certain type of anionic wetting agent, optionally together with a certain type of nonionic antifoaming agent, allows the formation of aqueous talc dispersions of very high solids content which are, even so, remarkably stable, of a relatively low viscosity, and compatible with the end-use resins.

The aqueous talc dispersions of this invention contain:

(a) at least 60 wt %, based on the total composition, of finely-divided talc; and (b) as a dispersing and wetting agent, at least 0.5 part by weight of one or more sulphated ethoxylated phenol, or alkylated phenol salt per hundred parts by weight talc, the phenol, or alkylated phenol, salt containing at least 48 wt % ethylene oxide (based on the unsulphated, unsalified phenol, or alkylated phenol, itself), and when alkylated the alkyl group(s) totalling up to 12 carbon atoms.

DESCRIPTION OF PREFERRED EMBODIMENTS

The sulphated ethoxylated phenol salt, which is employed primarily as a wetting agent to enable the talc to be dispersed in the water, is itself a fairly conventional anionic surface active agent, and thus may be used in the form of any of its usual salts, for example the sodium salt. The amount of ethylene oxide contained therein may vary up to 95 wt % (or more), though most conveniently it is around 65 to 85, especially 80, wt % (these figures are based on the phenol, or alkylated phenol, itself). The actual number of moles ethylene oxide per mole sulphated ethoxylated phenol salt will of course depend upon the alkyl groups (if any) substituted in the phenol ring. For example, the just quoted wt % figures give, for a sulphated ethoxylated nonyl phenol salt, roughly the quantities 50 (=95 wt %), 10 (=65 wt %), 30 (=85 wt %) and 20 (=80 wt %). However, if there is employed an unalkylated phenol (as the sulphated ethoxylated phenol salt) then the wt % (or moles/mole) of ethylene oxide can be on the low side—but when using an alkylated phenol then it is very much preferred to employ considerably more than just the minimum amount of ethylene oxide.

In practice, of course, the material used will generally be a mixture of different ethoxylates averaging out, on a wt % (or mole per mole) basis, in the chosen area. Moreover, while the ethoxylate is very preferably prepared from ethylene oxide only, nevertheless it may contain small quantities—of the order of one or perhaps two moles/mole—of another alkylene oxide, such as propylene oxide, provided this does not exert any seriously deleterious effect on the desirable properties of the sulphated ethoxylated phenol salt as a whole.

Where the sulphated ethoxylated phenol salt is alkylated, as is generally preferred, the alkyl moiety(s) is most advantageously a single alkyl group containing at least 8 carbon atoms. This alkyl group may be an octyl, nonyl (preferably), decyl or dodecyl group. Again, in practice, any alkylated material used will contain a mixture of different alkyl groups averaging out within the chosen range.

A typical sulphated ethoxylated alkyl phenol salt is that sold under the name PERLANKROL RN75 (which is essentially a 75% active solution of a sulphated nonyl phenol 20 moles ethoxylated sodium salt in aqueous alcohol).

The dispersion of the invention must contain at least 0.5 part by weight of sulphated ethoxylated phenol salt per hundred parts by weight talc, but it is preferred to use at least 1 part by weight (very high solids—70 wt % and more—dispersions may otherwise be too viscous). Furthermore, in order to reduce the possibility of undesirable air entrainment during preparation of the dispersion, it is advantageous to keep the sulphated material level at or below 3 parts by weight. A particularly preferred amount is 2 parts by weight.

While the compositions so far described are perfectly satisfactory, nevertheless they exhibit a tendency to foam formation. It is very much preferred, therefore, additionally to include in the composition, as a dispersing and air-release agent, at least 0.5 part by weight per 100 parts by weight talc, of one or more ethylene oxide/propylene oxide copolymer, preferably a block copolymer, which is based on a polypropylene glycol with a molecular weight of at least 1,000, contains at least 50 wt % ethylene oxide, and has a molecular weight of at least 4,000.

The ethylene oxide/propylene oxide block copolymer (the purpose of which is to enhance the ease with which air entrained in the dispersion is released therefrom) is also a fairly conventional nonionic surface active material. Thus conveniently it is based on a polypropylene glycol having a molecular weight of up to 2,000 (preferably 1,700), may contain up to 90 wt % ethylene oxide (preferably 80 wt %), and has a molecular weight of up to 12,000 (preferably 8,000). In practice, of course, the block copolymers used are mixtures of materials which have the chosen figures as an average.

A typical ethylene oxide/propylene oxide block copolymer is that sold under the name MONOLAN 8000E/80 (which has a molecular weight of 8,000, an ethylene oxide content of 80 wt %, and is based on a polypropylene glycol of molecular weight 1,700).

The dispersions of the invention preferably contain at least 1.0 part by weight of ethylene oxide/propylene oxide block copolymer per hundred parts by weight talc—and, for economic reasons, it is preferred to use no more than 3 parts by weight. Two parts by weight is the most convenient amount.

The relative proportions of sulphate salt material to block copolymer are advantageously from 1:3 to 3:1, though in general good results are economically achieved using amounts in the range 2:1 to 1:1 sulphate:-block copolymer.

The talc forming the major part (at least 60 wt %) of the dispersions of the invention may be any of the well-known finely-divided types of talc available. A particularly preferred talc is that known as FINNTALC C 10; this is a monoclinic material found in platelet form, having a refractive index of 1.57, a brightness of 84–85% (at 457 nm; Elrepho), a specific weight of 2.75 g/cc, a specific volume of 2-2.5 cc/g, and a hardness (on the Mohs scale) of 1. The particle distribution of FINNTALC C 10 is such that 99% is finer than 12 microns, 75% is finer than 4 microns, and 50% is finer than 2.3 microns.

Various additives may be employed to enhance both the ease of preparing the dispersions of the invention and their desirable properties. For example, sodium carboxy methyl cellulose, inorganic condensed polyphosphates or sodium naphthalene sulphonates can be incorporated, advantageously at a level of 0.5 p.b.w. per 100 parts by weight of talc.

The talc dispersions of the invention may be prepared simply by mixing the various ingredients, though in practice it is preferred to add to the talc a pre-mixed blend of the water, the dispersing agent(s), and any other additive. Furthermore, it is convenient first to prepare a dispersion having rather more water than required, and then to add more talc to bring the solids content up to the desired level.

The talc dispersions prepared in accordance with this invention are of significant value as coating pigment compositions for addition to resins employed to coat paper and like substrate. The dispersions of the invention are stable (they do not settle out on standing, or only to a slight degree), have an acceptable viscosity (they can be pumped, and blended with other materials, with relative ease), have a high solids content (allowing short drying times for the talc/resin coating), and are compatible with the resins normally used in coating compositions.

The following Examples are now given, though only by way of illustration, to show details of various aspects of the invention.

EXAMPLE 1

Preparation of Various Talc Dispersions using a constant amount of Perlankrol RN75

A series of aqueous talc dispersions was prepared from powdered talc (Finntalc C10), Pelankrol RN75 (sulphated nonyl phenol 20 moles ethoxylate, sodium salt, 75% active in aqueous alcohol), Calgon (sodium hexametaphosphate) and water.

Throughout the series there were used 100 p.b.w. talc, 3 p.b.w. Perlankrol RN75 and 0.5 p.b.w. Calgon, the amount of water varying from 65 p.b.w. down to 40 p.b.w. (thus, giving dispersions containing from 61 to 74 wt % based on the total weight of talc+water).

The final compositions varied from thin low viscosity dispersions to thicker less mobile pastes, and are summarised in Table 1 below:

TABLE 1

| | Amounts (p.b.w.) | | | | | | |
|---|---|---|---|---|---|---|---|
| Talc | 100 | 100 | 100 | 100 | 100 | 100 | 100 |
| Perlankrol RN75 (active) | 3 | 3 | 3 | 3 | 3 | 3 | 3 |
| Calgon | 0.5 | 0.5 | 0.5 | 0.5 | 0.5 | 0.5 | 0.5 |
| Water | 65 | 60 | 55 | 50 | 45 | 40 | 35 |
| % talc based on talc + water | 61 | 62.5 | 64.5 | 67 | 70 | 71 | 74 |
| Comments | low viscosity stable dispersion | low viscosity stable dispersion | mobile stable dispersion | mobile stable dispersion | mobile stable dispersion | high viscosity dispersion | stable paste |
| Viscosity (centipoises) 25%° C. | 840 | 991 | 1,370 | 1,450 | 1,588 | 1,670 | — |

It is clear that with these components in these amounts the least amount of water usable was 40 p.b.w. (relatively 28% w/w), giving a solids content of about 70 wt % talc.

EXAMPLE 2

Preparation of Various Talc Compositions using different amounts of Perlankrol RN75

The procedure of Example 1 was repeated, but using different amounts of Perlankrol RN75. This series of aqueous dispersions contained 100 p.b.w. talc, 0.5 p.b.w. Calgon and either 1 or 2 p.b.w. Perlankrol RN75.

The prepared compositions containing the minimum water, and thus maximum talc, were made using 40 p.b.w. water, giving talc solids of approximately 70 wt %.

The 1 p.b.w. Perlankrol RN75 composition though stable was of an undesirably high viscosity (5,100 cps.); the other composition was acceptable both in terms of its stability and in terms of its viscosity (1,400 cps.).

EXAMPLE 3

Preparation of Various Talc Compositions using different Dispersing Agents

Dispersing Agents

Repeating the procedure of Example 1, a series of comparative and inventive talc compositions was prepared using different dispersing agents, though each composition used the same quantities of components (thus, 100 p.b.w. talc, 3 p.b.w. (active) dispersing agent and 0.5 p.b.w. Calgon).

The minimum usable amount of water consistent with a stable composition of viscosity less than 2,000 cps. was determined in each case, and the results are shown in Table 2.

The Comparative dispersions were prepared as the dispersing agent using either a nonyl phenol ether sulphate containing too little ethylene oxide (A and B) or a comparable alcohol ether sulphate—an agent of quite the wrong type (G, H and I). As can clearly be seen, only the inventive dispersions (C, D, E and F) were of satisfactory stability and viscosity.

EXAMPLE 4

Preparation of Talc Compositions using an Additional Dispersing Agent to reduce Air Entrainment and Foaming The procedure of Example 1 was repeated, but in addition to the Perlankrol RN75 there were used varying amounts of Monolan 8000 E80 such that the total amount of the two surfactants added up to 3 p.b.w.

The results for the minimum added water giving stable compositions of viscosity less than 2000 cps. are shown in Table 3 below:

TABLE 3

| Dispersing Agent Perlankrol RN75/ Monclan 8000 E80 | | Water (pbw per 100 pbw talc) | Wt. % Talc | Viscosity cps. at 25° C. | * % Air Entrained on Manufacture |
|---|---|---|---|---|---|
| 3.0 | — | 40 | 69 | 1,670 | 15.0 |
| 2.25 | 0.75 | 40 | 69.7 | 1,960 | 10.5 |
| 1.5 | 1.5 | 45 | 67.3 | 1,460 | 7.0 |
| 1.0 | 2.0 | 60 | 61.2 | 915 | 6.5 |

* Measured by comparison of specific gravities within 24 hours of manufacture using 1.8 as the specific gravity of an air-free composition.

It is clear that a reduction in air content is effected by incorporating Monolan 8000 E/80, although at the expense of slightly lower solids contents.

We claim:

TABLE 2

| | Dispersing Agent | Amount of Water (pbw per 100 pbw talc) | Wt. % Talc | Comments |
|---|---|---|---|---|
| A | Nonyl phenol 5.5 mol. (52 wt %) ether sulphate (ammonium salt) | 80 | 54.5 | Unstable low viscosity dispersion. |
| B | Nonyl phenol 5.5 mol. (52 wt %) ether sulphate (sodium salt) | 75 | 56.0 | Unstable low viscosity low solids dispersion. |
| C | Phenol 4 mole (65 wt %) ether sulphate (sodium salt) | 55 | 64.5 | Stable low viscosity dispersion. |
| D | Nonyl phenol 9 mol (64 wt %) ether sulphate (sodium salt) | 60 | 61.2 | Stable low viscosity dispersion. |
| E | Nonyl phenol 30 mol. (85 wt %) (sodium salt) | 47.5 | 66.0 | Stable viscous dispersion. |
| F | Dodecyl phenol 10 mol. ether sulphate (63 wt %) (sodium salt) | 60 | 61.2 | Stable low viscosity dispersion. |
| G | $C_{12-15}$ alcohol 3 mol. (39 wt %) ether sulphate (sodium salt) | 75+ | — | Stiff paste. |
| H | $C_{12-15}$ alcohol 9 mol. (66 wt %) ether sulphate (sodium salt) | 75+ | — | Stiff paste. |
| I | $C_{9-11}$ alcohol 12 mol. 77.5 wt % ether sulphate (sodium salt) | 75+ | — | Stiff paste. |

1. A stable aqueous talc dispersion containing
   (a) at least 60 wt %, based on the total composition, of finely divided talc; and
   (b) as a dispersing and wetting agent, at least 0.5 part by weight of one or more sulphated ethoxylated phenol, or alkylated phenol, salt per hundred parts by weight talc, the phenol, or alkylated phenol, salt containing at least 48 wt % ethylene oxide (based on the unsulphated, unsalified phenol, or alkylated phenol, itself), and when alkylated the alkyl group(s) totalling up to 12 carbon atoms.

2. A stable aqueous talc dispersion containing:
   (a) at least 60 wt %, based on the total composition, of finely divided talc; and
   (b) as a dispersing and wetting agent, at least 0.5 part by weight of one or more sulphated ethoxylated alkyl phenol salt per hundred parts by weight talc, the sulphated ethoxylated alkyl phenol salt containing at least 8 moles/mole ethylene oxide, its alkyl group having from 8 to 12 carbon atoms.

3. A dispersion as claimed in claim 2, wherein the sulphated ethoxylated alkyl phenol salt is the sodium salt.

4. A dispersion as claimed in claim 2, wherein the amount of ethylene oxide contained in the sulphated ethoxylated alkyl phenol salt is from 65 to 85 wt %.

5. A dispersion as claimed in claim 4, wherein the amount of ethylene oxide is approximately 80 wt %.

6. A dispersion as claimed in claim 2 wherein the sulphated ethoxylated alkyl phenol salt is a nonyl phenol derivative.

7. A dispersion as claimed in claim 2 which contains from 1 to 3 parts by weight of sulphated ethoxylated alkyl phenol salt per hundred parts by weight talc.

8. A dispersion as claimed in claim 7 which contains approximately 2 parts by weight sulphated ethoxylated alkyl phenol salt per 100 parts by weight talc.

9. A dispersion as claimed in claim 1 or 2 which contains in addition, as a dispersing and air-release agent, at least 0.5 part by weight per 100 parts by weight talc, of one or more ethylene oxide/propylene oxide copolymer which is based on a polypropylene glycol with a molecular weight of at least 1,000, contains at least 50 wt % ethylene oxide, and has a molecular weight of at least 4,000.

10. A dispersion as claimed in claim 9, wherein the ethylene oxide/propylene oxide copolymer is a block copolymer based on a polypropylene glycol having a molecular weight of up to 2,000, contains up to 90 wt % ethylene oxide, and has a molecular weight of up to 12,000.

11. A dispersion as claimed in claim 9 which contains from 1 to 3 parts by weight of ethylene oxide/propylene oxide copolymer per hundred parts by weight talc.

12. A dispersion as claimed in claim 9 which contains approximately 2 parts by weight ethylene oxide/propylene oxide copolymer per 100 parts by weight talc.

13. A dispersion as claimed in claim 9, wherein the relative proportions of sulphate salt material to copolymer are from 1:3 to 3:1.

14. An aqueous talc dispersion which is stable and has a viscosity enabling it to be pumped relatively easily including (a) at least 60 wt %, based on the total weight of the composition, of finely divided talc; and (b) at least 0.5 part by weight per hundred parts by weight of talc of a sulphated ethoxylated phenol salt containing at least 48 wt % ethylene oxide based on the unsulphated, unsalified phenol.

15. An aqueous talc dispersion which is stable and has a viscosity enabling it to be pumped relatively easily including
   (a) at least 60 wt % based on the total weight of the composition, of finely divided talc; and
   (b) at least 0.5 part by weight of a sulphated ethoxylated alkyl phenol salt per hundred parts by weight of talc, the alkyl group of said salt having up to 12 carbon atoms, and said salt containing at least 8 moles of ethylene oxide per mole of said salt.

16. A dispersion according to claim 14 or 15 wherein said dispersion includes no more than about 3 parts by weight of said salt per 100 parts by weight of talc.

17. A dispersion according to claim 14 or 15 which contains in addition, as a dispersing and air-release agent, at least 0.5 part by weight per 100 parts by weight talc, of one or more ethylene oxide/propylene oxide copolymer which is based on a polypropylene glycol with a molecular weight of at least 1,000, contains at least 50 wt % ethylene oxide, and has a molecular weight of at least 4,000.

18. A method for preparing an aqueous talc dispersion which is stable and has a viscosity enabling it to be pumped relatively easily and including at least 60 wt %, based on the total weight of the composition, of finely divided talc comprising: combining said talc, water, and dispersing agent in an amount of at least 0.5 part by weight per hundred parts by weight talc, said amount being sufficient to render said talc dispersed in said water in stable form, said dispersing agent being one or more sulphated ethoxylated phenol, or alkylated phenol, salt containing at least 48 wt % ethylene oxide (based on the unsulphated, unsalified phenol, or alkylated phenol, itself), and when alkylated the alkyl group(s) totaling up to 12 carbon atoms.

19. A method according to claim 18 including at least about 0.5 part by weight of said sulphated ethoxylated phenol salt per 100 parts by weight of talc.

20. A method according to claim 18 including at least about 0.5 part by weight of said sulphated ethoxylated alkylated phenol salt per 100 parts by weight of talc.

* * * * *

UNITED STATES PATENT AND TRADEMARK OFFICE
CERTIFICATE OF CORRECTION

PATENT NO. : 4,187,192
DATED : February 5, 1980
INVENTOR(S) : Geoffrey P. Sheridan It is certified that error appears in the above-identified patent and that said Letters Patent are hereby corrected as shown below:

Column 2, line 41, "ethoxylated" should read --ethoxylate--.

Column 4, line 6, "substrate" should read --substrates--.

Column 4, line 53, "25%°C." should read --25°C--.

Column 5, Table 2, in the column headed "Dispersing Agent", in Example E, read --ether sulphate-- between the lines "30 mol. (85 wt %)" and "(sodium salt)".

Signed and Sealed this

Seventeenth Day of June 1980

[SEAL]

Attest:

SIDNEY A. DIAMOND

Attesting Officer  Commissioner of Patents and Trademarks